United States Patent [19]
Kaywood

[11] Patent Number: 5,263,249
[45] Date of Patent: Nov. 23, 1993

[54] LIGHTWEIGHT COMPOSITE CAMSHAFT, METHOD OF ASSEMBLY

[75] Inventor: Roy G. Kaywood, Jackson, Mich.

[73] Assignee: General Motors Corporation, Detroit, Mich.

[21] Appl. No.: 916,357

[22] Filed: Jul. 20, 1992

[51] Int. Cl.⁵ ............................................. B23P 15/00
[52] U.S. Cl. .............................. 29/888.1; 29/888.08
[58] Field of Search .............. 29/888.1, 888.08, 523; 74/567

[56] References Cited

U.S. PATENT DOCUMENTS

| Re. 33,888 | 4/1992 | Hartnett et al. | 29/888.1 |
|---|---|---|---|
| 275,842 | 8/1927 | Yassenoff. | |
| 4,438,555 | 3/1984 | Tsumuki et al. | 29/888.1 |
| 4,597,365 | 7/1986 | Madaffer. | |
| 4,638,683 | 1/1987 | Ogawa et al. | |
| 4,835,832 | 6/1989 | Arnold et al. | |
| 4,882,825 | 11/1989 | Nakamura | 29/888.1 |
| 5,085,099 | 2/1992 | Hughes | 29/888.1 |

FOREIGN PATENT DOCUMENTS

| 3346056 | 7/1984 | Fed. Rep. of Germany. | |
| 0129249 | 10/1979 | Japan | 29/888.1 |
| 0190501 | 9/1985 | Japan | 29/888.1 |

Primary Examiner—Irene Coda
Attorney, Agent, or Firm—Robert J. Outland

[57] ABSTRACT

A lightweight composite camshaft has stamped sheet metal or other lightweight journal and/or cam elements having locating hubs and assembled onto a hollow tube. An economical and rapid method of assembly uses indexing balls pressed into accurately positioned blind holes in the tube and grooves in the bores or hubs of the cam elements to angularly locate the cams with precision prior to locking them tightly in place by expansion of the tube.

7 Claims, 4 Drawing Sheets

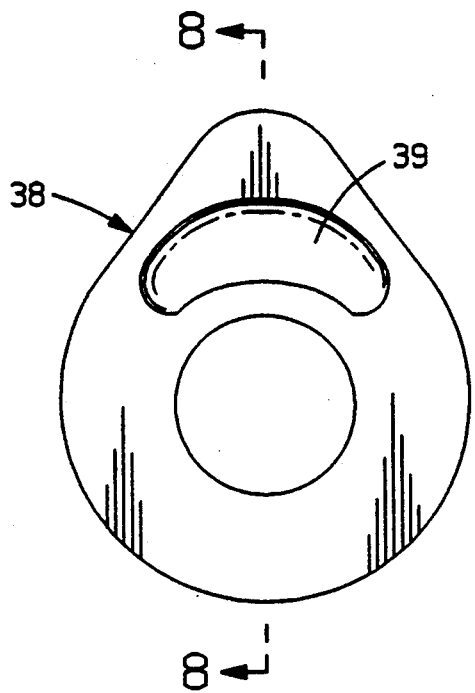 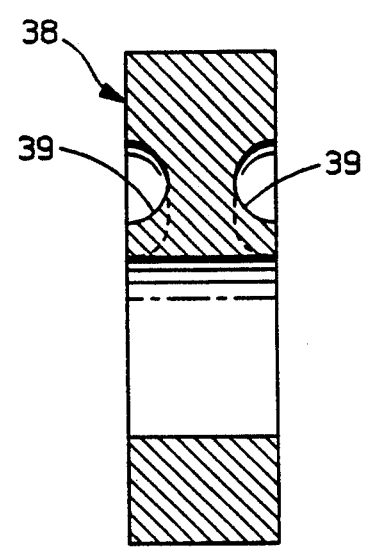
FIG. 7  FIG. 8
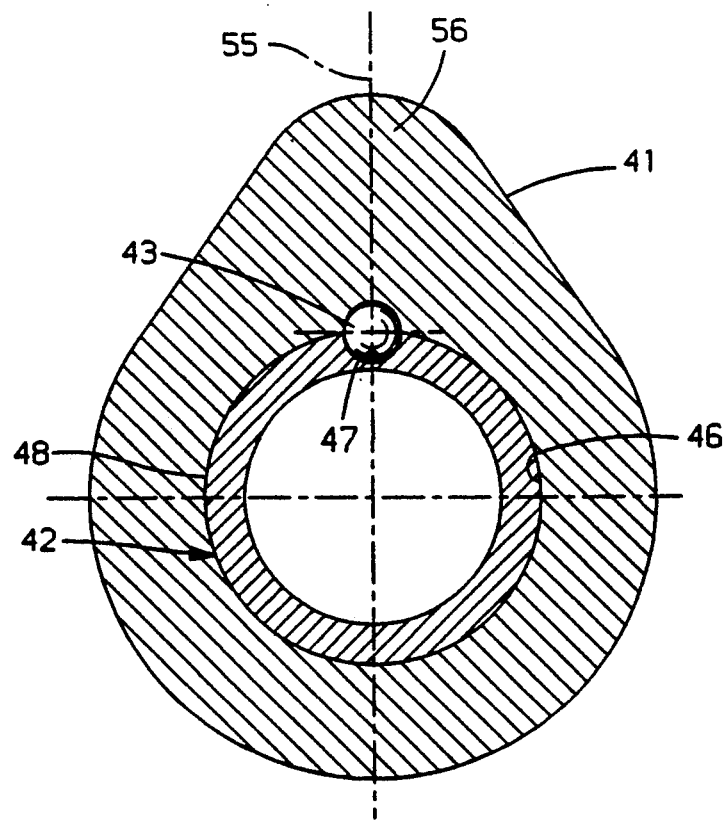
FIG. 11

LIGHTWEIGHT COMPOSITE CAMSHAFT, METHOD OF ASSEMBLY

TECHNICAL FIELD

This invention relates to camshafts for internal combustion engines and the like. In particular the invention relates to assembled or composite camshafts and methods for their manufacture.

BACKGROUND

U.S. Pat. Nos. 4,567,365 issued Jul. 1, 1986 and 4,835,832 issued Jun. 6, 1989 to the assignee of the present invention and German patent application publication DE 3346056 A1 published Jul. 19, 1984 disclose various forms of assembled or composite camshafts and methods for their assembly. The U.S. patents involve composite camshafts assembled from individual elements such as cams and journals mounted on a hollow tube by mechanical expansion with a ball or mandrel. The German publication shows a hollow camshaft made up of separate hollow elements connected by friction welding. One embodiment includes lightweight formed sheet metal journals.

U.S. Pat. No. 4,638,683 issued Jan. 27, 1987 discloses composite camshafts having ceramic cam sections connected by interference fitted metallic sleeves. Balls received in shaft dimples and engaging grooves in the sleeves are provided for locating and locking the elements in their desired angular orientations.

SUMMARY OF THE INVENTION

The present invention provides modified camshaft structures and assembly methods wherein lightweight camshaft assemblies may be made using previously known tube expansion methods as well as modifications of such methods. The composite lightweight camshafts preferably have lightweight hollow core journal and/or cam elements including hubs suitable for assembly of the elements on a tube by mechanical expansion. The hub portion of each element has adequate length to guide and support the element on the tube and adequate strength to avoid distortion during tube expansion.

Assembly methods depart from known processes in using a timing procedure wherein balls are embedded in undersized premachined dimples comprising shallow blind holes or recesses in a tube and positioning pregrooved elements on the tube to provide accurate timing of the elements prior to tube expansion for locking the components together.

These and other features and advantages of the invention will be more fully understood from the following description of certain specific embodiments of the invention taken together with the accompanying drawings.

BRIEF DRAWING DESCRIPTION

In the drawings:

FIGS. 7 and 8 are end and transverse cross-sectional views of still another alternative embodiment of lightweight cam element;

FIG. 11 is a cross-sectional view through a cam of a finished camshaft assembled by the method of FIGS. 9 and 10.

DETAILED DESCRIPTION

Figure 1:
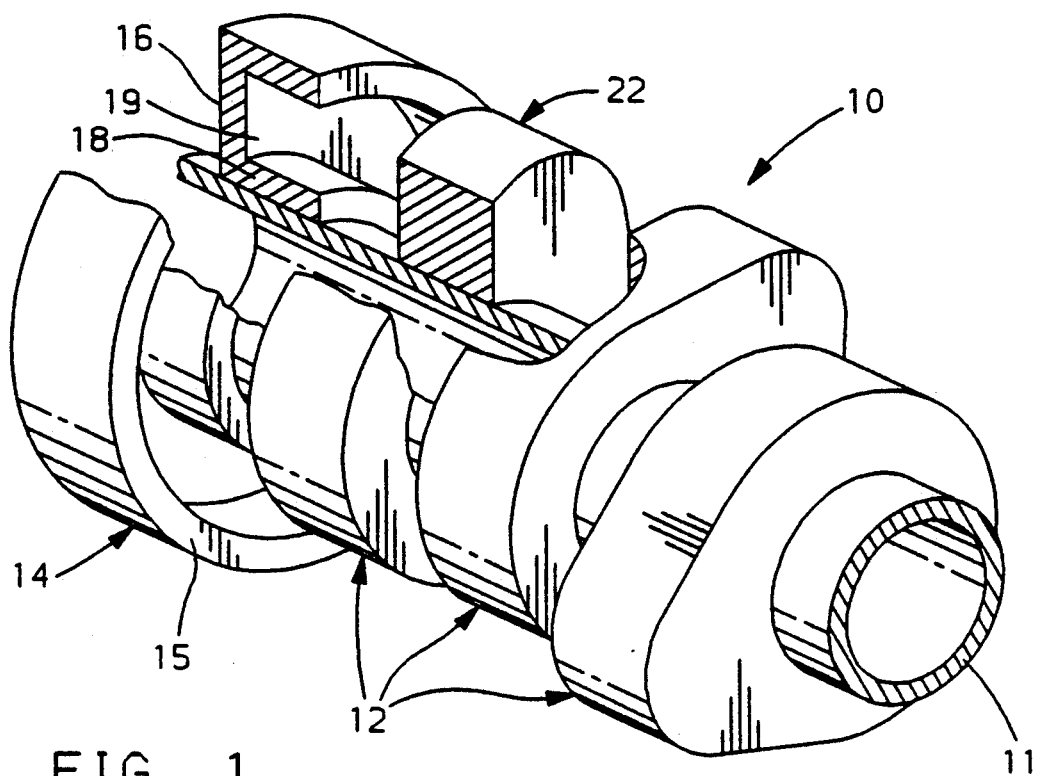
FIG. 1 is a fragmentary pictorial view of an engine camshaft having lightweight formed bearing journals according to the invention.

Referring now to the drawings in detail, FIG. 1 shows a portion of a composite or assembled camshaft 10 which is generally of the type shown in our earlier U.S. Pat. No. 4,835,832, noted above. Camshaft 10 includes a hollow supporting shaft or tube 11 on which are mounted a number of cam elements 12 and journal elements 14 using any suitable manner of assembly including methods of mechanical tube expansion as disclosed, for example, in U.S. Pat. No. 4,835,832 and subsequently herein.

The FIG. 1 embodiment differs from the prior disclosures in the provision of a lightweight bearing journal 14 in place of the solid journal shown in the earlier patent. The journal 14 includes a cylindrical outer wall 15 connected at one end by a solid web or end wall 16 with a hub 18 that extends parallel with the outer wall and fixes the journal squarely and solidly in place on the tube 11. The shape leaves within the journal a hollow annulus 19 open at one end which reduces the mass of the journal element as compared to solid elements.

The journal 14 is preferably made by stamping or roll forming from a sheet metal blank, although any other suitable method of making could be used. Mass metal forming such as hot or cold forming from bar stock and powder metal forming are examples. The strength of the walls and, thus, their thicknesses must be adequate for their functions, the outer wall 15 to engage the bearing, the end wall 16 to support the outer wall and the hub 18 to withstand the forces resulting from assembly of the journal 14 on the tube 11 as well as the loads placed on the journal.

Figure 2:
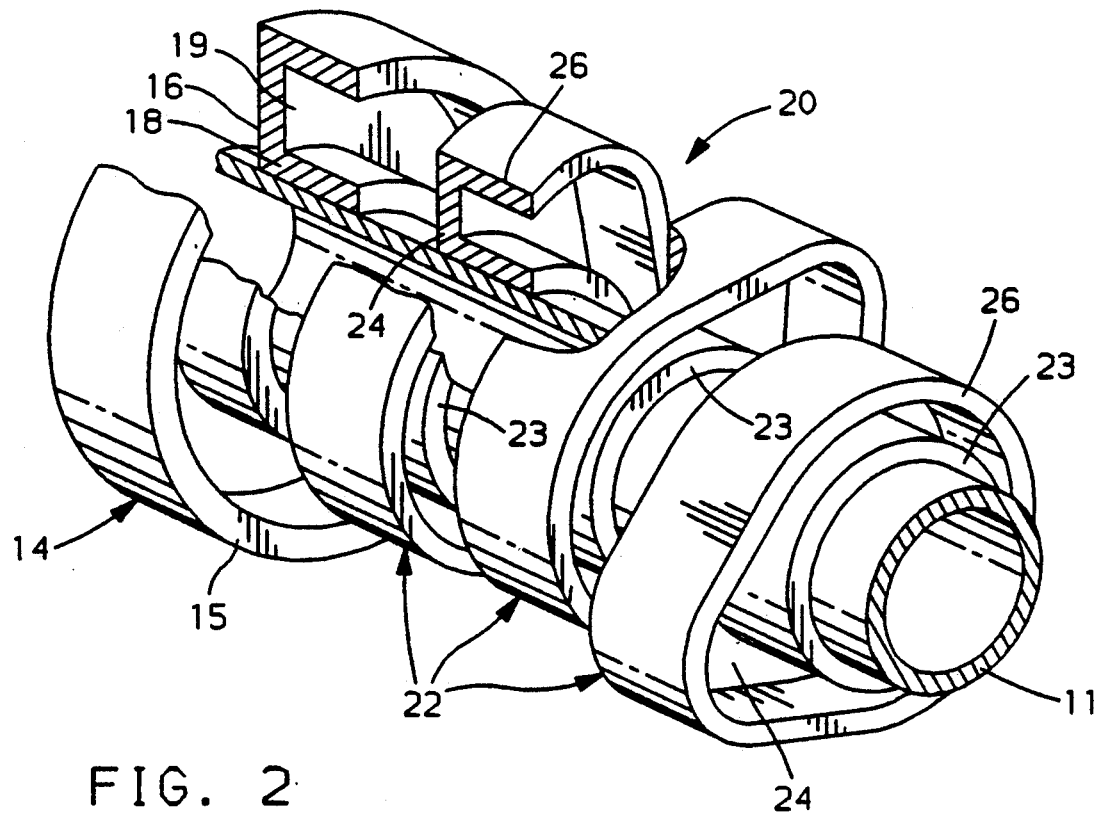
FIG. 2 is a fragmentary pictorial view of an engine camshaft having lightweight formed cam elements according to the invention.

FIG. 2 shows a portion of a composite or assembled camshaft 20 which is similar to camshaft 10 but also includes lightweight cams 22 which may be formed similarly to the journals 14. The cams also include hubs 23, end walls 24 and outer walls 26 for similar purposes as in the journals and subject to similar strength and thickness requirements to accomplish their functions. Obviously, the outer walls in use engage cam followers for actuating engine valve gear in known manner.

Figure 3:
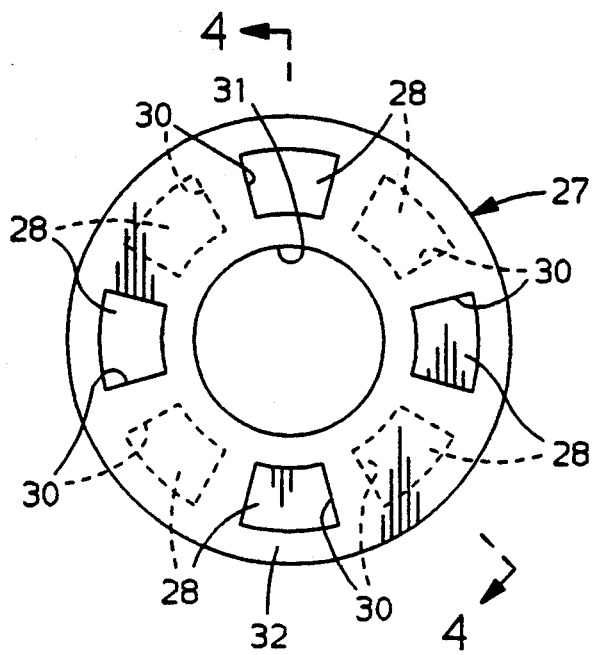
FIGS. 3 and 4 are end and transverse cross-sectional views of an exemplary alternative embodiment of lightweight bearing journal.
Figure 4:
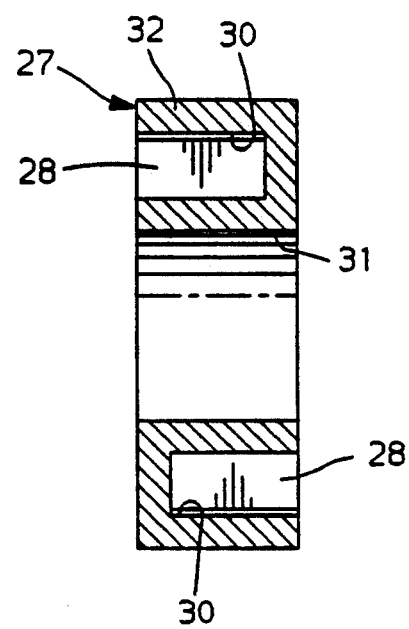
Figure 5:
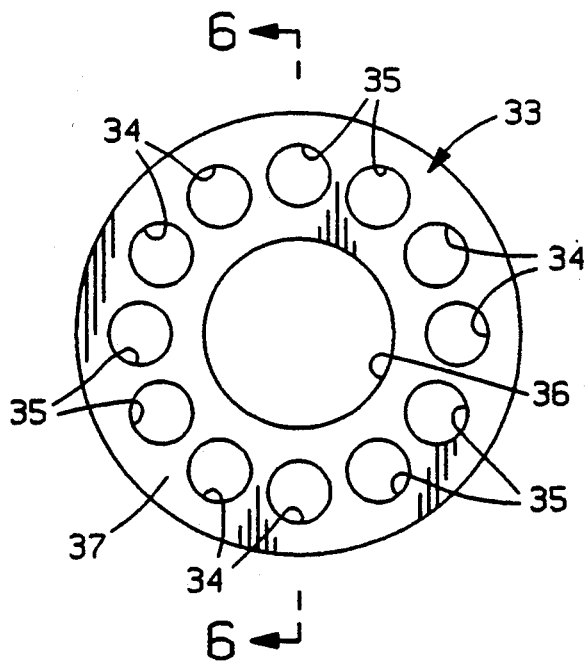
FIGS. 5 and 6 are end and transverse cross-sectional views of another alternative embodiment of lightweight bearing journal.
Figure 6:
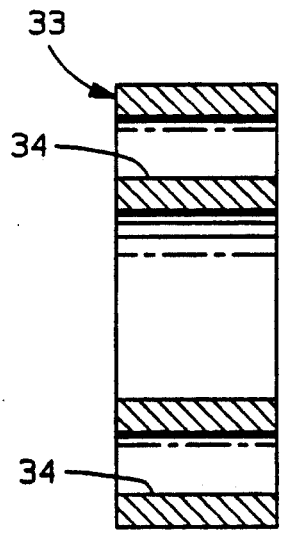

FIGS. 3-8 show other embodiments of lightweight journal and cam elements which could be used in composite camshafts. In FIGS. 3 and 4, bearing journal 27 has alternately oppositely opening recesses 28 that leave a staggered web 30 connecting the hub 31 with the outer wall 32. In FIGS. 5 and 6, journal 33 has lightening holes 34 extending axially through an otherwise solid body to form radial spokes 35 connecting a hub 36 with an outer wall 37. FIGS. 7 and 8 show a cam element 38 with side recesses 39 in the nose for lightening. This embodiment is applicable to smaller cams where formed sheet metal could not be utilized. All the embodiments of FIGS. 3–8 are suitable for mass metal forming.

The camshafts so far described can be suitably manufactured using the methods, equipment and construction features disclosed in the noted U.S. Pat. No. 4,835,832. However, FIGS. 9–11 illustrate a variation of this method which avoids the need for specific assembly fixtures and significantly reduces the cost of manufacturing new design or low volume camshaft assemblies.

In this method, a camshaft assembly 40 is prepared for the tube expansion step of U.S. Pat. No. 4,835,832 by locating cam elements or cams 41 on the tube 42 with small locating or timing balls 43 which may be hardened steel bearing balls. The balls engage slightly undersize grooves 44 in the bores 46 in the bodies or hubs of the cam elements 41 and slightly undersize blind holes 47 in the outside 48 of the tube 42 to accurately fix by interference fit the cam elements in their proper angular orientations for the tube expansion step. This results in accurate timing of the cams in the resulting assembled composite camshaft.

Figure 9:
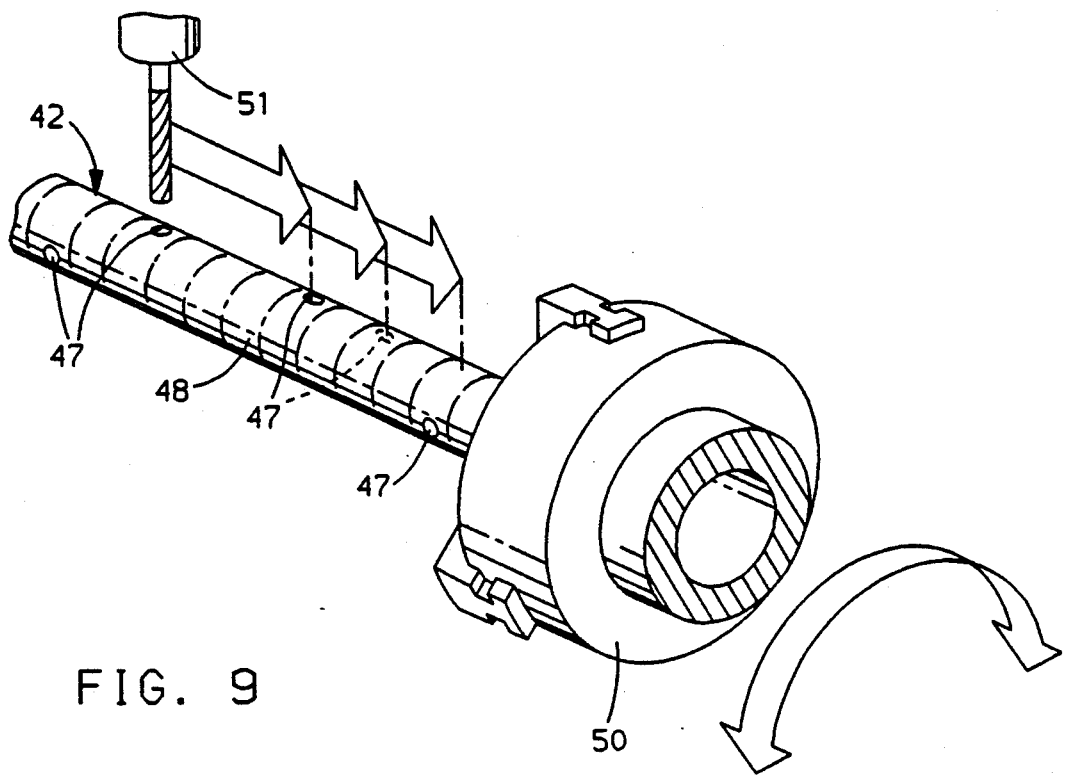
FIG. 9 is a pictorial view illustrating a step in a modified method of composite camshaft assembly according to the invention.
Figure 10:
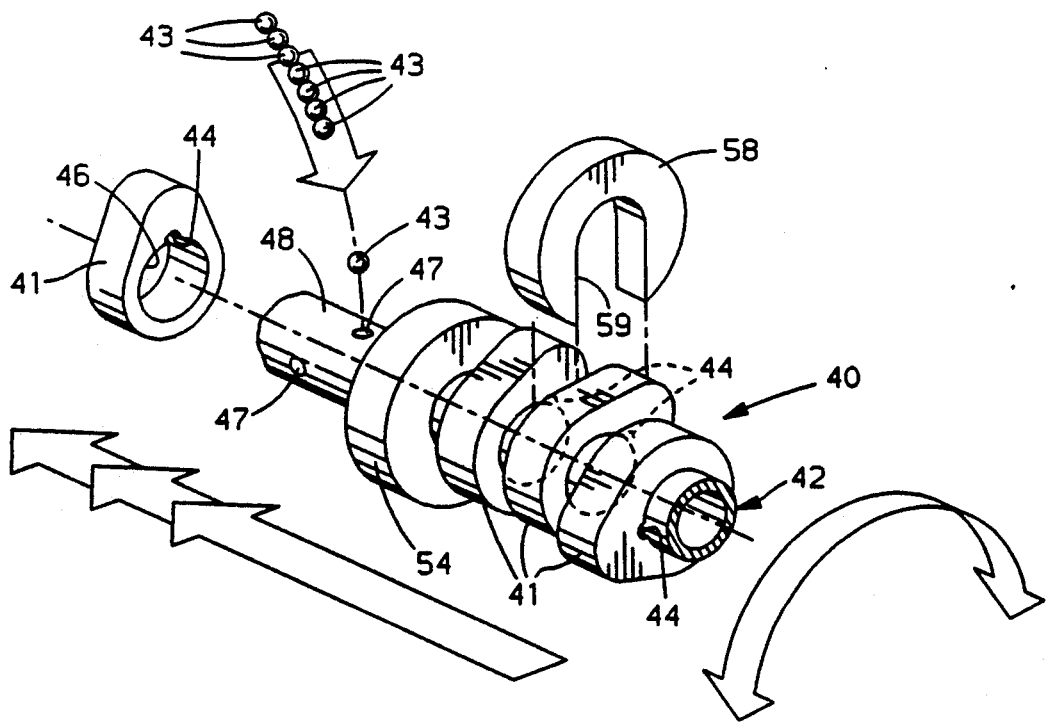
FIG. 10 is a pictorial view showing a later step in the assembly method.

The modified assembly method of this invention begins with the mounting of the tube or shaft 42 in the rotatable head or chuck 50 of an indexing machine such as a four axis computer numerically controlled (CNC) mill, with a drill head 51 as shown in FIG. 9. The tube is sequentially rotationally indexed and the drill head or the tube is advanced longitudinally to the proper positions at which cams are to be located and a blind index hole 47 is drilled at a precisely controlled point at each location.

Also, prior to assembly, the individual cam elements 41 and journal elements 54 to be assembled on the tube 42 are formed in any suitable manner along with any gears, flanges or other components (not shown) to be included in the assembly. The cams and journals may be lightweight elements as in the embodiments of FIGS. 1–8 or they may be solid as shown in prior U.S. Pat. No. 4,835,832. They may be hardened as desired and are preferably ground or otherwise formed to their proper widths prior to assembly.

The cams 41 are each provided with a bore 46 sized for close fitting over the outer diameter 48 of the tube 42. Preferably the bore 46 is formed with a special shape as disclosed in the prior U.S. Pat. No. 4,835,832. The bore is also provided with a shallow groove 44 for receiving a timing ball 43. A steel bearing ball with a diameter of ⅛ inch (3.175 mm) has been found suitable for use as a timing ball in an automotive engine camshaft as described in the prior patent. Each groove must be formed in a known angular location relative to the cam form, and may, for convenience, be centered on the longest diameter 55 passing through the high point or tip of the nose 56 of the raised lobe of its respective cam. Extreme accuracy may be obtained, for example, by forming the periphery of the lobe and locating the timing groove in the same machining operation. The blind holes 47 and the cam grooves 44 are preferably sized with diameters (or radii) slightly smaller (e.g. 0.002 in or 0.051 mm) than the ball 43.

After this preparation, the cams, journals and other elements are assembled in sequence on the tube 42 as shown in FIG. 10. The tube 42 is preferably positioned vertically for this step, although it may be otherwise positioned, e.g. horizontally, if desired. As the elements are located sequentially on the tube, C-shaped spacers 58, each having a slot 59, are slid over the tube between each adjacent pair of elements 41, 54 to properly control the longitudinal spacing and positions of the elements. This is similar to the assembly process described in U.S. Pat. No. 4,835,832. The spacers are preferably positioned with their slots 59 opening in the same direction for convenience in the subsequent tube expansion step.

Prior to assembly of each cam element 41, a ball 43 is placed into the blind indexing hole 47 for that cam and is held in place while the cam element 41 is slid onto the tube 42 with its groove 44 engaging the ball 43. The element 41 is then forced over the ball 43 until it engages the spacer 58 which locates the element longitudinally on the tube 42. Because the diameters of the blind hole 47 and groove 44 are slightly smaller than the ball 43, the ball engages the edges of both the hole 47 and groove 44 and deforms them slightly upon assembly. This closely positions the groove 44 in alignment with the hole 47 to accurately index the cam element 41 angularly on the tube 42. Ball location is not used with the journals 54 or other elements which are symmetrical and do not require angular positioning.

When all the elements 41, 54 etc. have been assembled sequentially on the tube with the cams angularly positioned in the manner just described and C-shaped spacers 58 located between the elements for longitudinal positioning, the assembly 40 is transferred to a simple fixture (not shown) for the tube expansion step. This fixture may be positioned with the camshaft assembly horizontal and the slots 59 of the spacers 58 facing downward for gravity retention on the tube.

Tube expansion is preferably accomplished in essentially the manner described in said U.S. Pat. No. 4,835,832, although other methods of tube expansion may be utilized. However, the fixture described in the patent may be simplified since it does not need to locate the cams (as this is done by the locating balls 43) and needs only to restrain the camshaft from bending, such as by restraining the journal elements 54 against lateral motion. This simplification avoids the need for expensive fixtures to be provided for each new camshaft assembly and greatly increases the speed, accuracy and economy with which a new or modified camshaft design may be assembled for testing and development. The method may also be used for production assembly but would be most suitable for smaller volumes where the provision of more complicated fixtures is not economical.

After the elements 41, 54 are firmly fixed to the tube 42 by expansion, the spacers 58 are removed and the assembled composite camshaft may be finished by final machining of the cams, journals and other elements as required in accordance with ordinary camshaft machining procedures. The advantages of minimum machining requirements for assembled camshafts as in U.S. Pat. No. 4,835,832 are fully possessed by camshafts formed according to the present method. The advantages may be greater if the accuracy of location of the cam elements made possible by precision location of the index balls 43 is fully realized.

While the invention has been described by reference to certain preferred embodiments and methods, it should be understood that numerous changes could be made within the spirit and scope of the inventive concepts described. Accordingly it is intended that the invention not be limited to the specifically disclosed methods and embodiments, but that it have the full scope permitted by the language of the following claims.

What is claimed is:

1. A method of making a composite camshaft comprising the steps of
   machining a blind hole into an outer surface of a hollow tube with a predetermined external diameter at each of a plurality of preselected axial cam locations,
   providing a groove in the inner surface of a bore of each of preformed cams for mounting the cams with their bores close fitting on the tube, one at each of said preselected cam locations, the cam grooves and the tube holes being located to provide a desired angular orientation timing of the cams upon assembly on the tube,
   assembling the cams on the tube at their preselected axial locations and in their desired angular orientations by seating a timing ball in each of the blind holes, aligning the groove of each cam with the ball at its corresponding location, and sliding each cam into its axial location with its groove engaging the ball seated in the respective blind hole to locate the cam in its desired angular orientation, and
   locking the cams permanently in position by expanding the tube into interference engagement with the respective cams.

2. A method of making a composite camshaft as in claim 1 and comprising the further steps of forming the diameters of the blind holes and the grooves slightly smaller than that of the balls such that the balls engage the edges of their associated blind hole and groove during the cam assembly step.

3. A method of making a composite camshaft as in claim 2 wherein the balls, are sized to slightly deform the edges of the grooves and blind holes during the cam assembly and tube expansion steps.

4. A method of making a composite camshaft as in claim 1 wherein the tube expansion step is performed by mechanical means during which the cam spacing is maintained by spacers disposed between adjacent elements mounted on the tube.

5. A method of making a composite camshaft as in claim 4 wherein the step of assembling the cams on the tube is performed by sequential assembly of the individual cams using the spacers between elements to axially locate the cams upon assembly.

6. A method of making a composite camshaft as in claim 1 wherein the cams are initially formed by one of the methods of mass forming-including cold, warm and hot forming from slugs and powder metal compaction- and sheet metal forming-including stamping and roll forming.

7. A method of making a composite camshaft as in claim 6 wherein the grooves are formed in the cam bores during the initial forming of the cams.

* * * * *